United States Patent
Meshengisser et al.

[11] Patent Number: 5,888,391
[45] Date of Patent: Mar. 30, 1999

[54] AERATING DEVICE

[75] Inventors: Jury Mikhailovich Meshengisser; Rostislav Anatolievich Galich; Jury Grigorievich Marchenko; Victor Andreevich Chernukha, all of Kharkov, Ukraine

[73] Assignee: Sovmestnoe Rossysko-Ukrainskoe predpriyatie Obshestvo s ogranichennoi otvetstvennostju Nauchno—proizvodstvennaya firma Ecopolimer (OOO NPF "Ecopolimer"), Belgorod, Russian Federation

[21] Appl. No.: 153,196

[22] Filed: Sep. 15, 1998

[51] Int. Cl.[6] ....................................................... B01F 3/04
[52] U.S. Cl. ........................ 210/220; 261/122.1; 261/124
[58] Field of Search ........................ 210/220; 261/122.1, 261/124, 122.2

[56] References Cited

U.S. PATENT DOCUMENTS

| | | |
|---|---|---|
| 3,532,272 | 10/1970 | Branton . |
| 4,960,546 | 10/1990 | Tharp . |
| 4,960,706 | 10/1990 | Bliem . |
| 5,075,048 | 12/1991 | Veeder . |
| 5,587,114 | 12/1996 | Tharp . |
| 5,788,847 | 8/1998 | Tharp . |
| 5,800,705 | 9/1998 | Downs . |

FOREIGN PATENT DOCUMENTS 1149374   7/1987   Canada .

Primary Examiner—Thomas M. Lithgow
Attorney, Agent, or Firm—Collard & Roe, P.C.

[57] ABSTRACT

The aerating device comprises an air conduit assembled from a plurality of aerating modules tightly held together. Each of the aerating modules comprises an annular disperser and a sectional tubular member on which the disperser is horizontally cantilevered in the area where the components of the tubular member are held together and with which it communicates by compressed air. The disperser has a seating ring provided with a hole for compressed air to pass, the axis of the hole being misaligned with respect to the axis of the annular disperser, and a dispersing member defining, together with the seating ring, an annular space wherein a ring-shaped throttling member is fixed place. The disperser is capable of performing setting-up motions round the vertical axis of the hole in the seating ring and is provided with device for its being held rigidly to the sectional tubular member, which device has a vertical passage coaxial with the holes in the seating ring. The flow passage area of the throttling member equals from 0.15 to 1.0 the cross-sectional area of the vertical passage, and the ratio between the outside diameter of the annular disperser and the hole diameter is from 1.5 to 2.6.

7 Claims, 3 Drawing Sheets

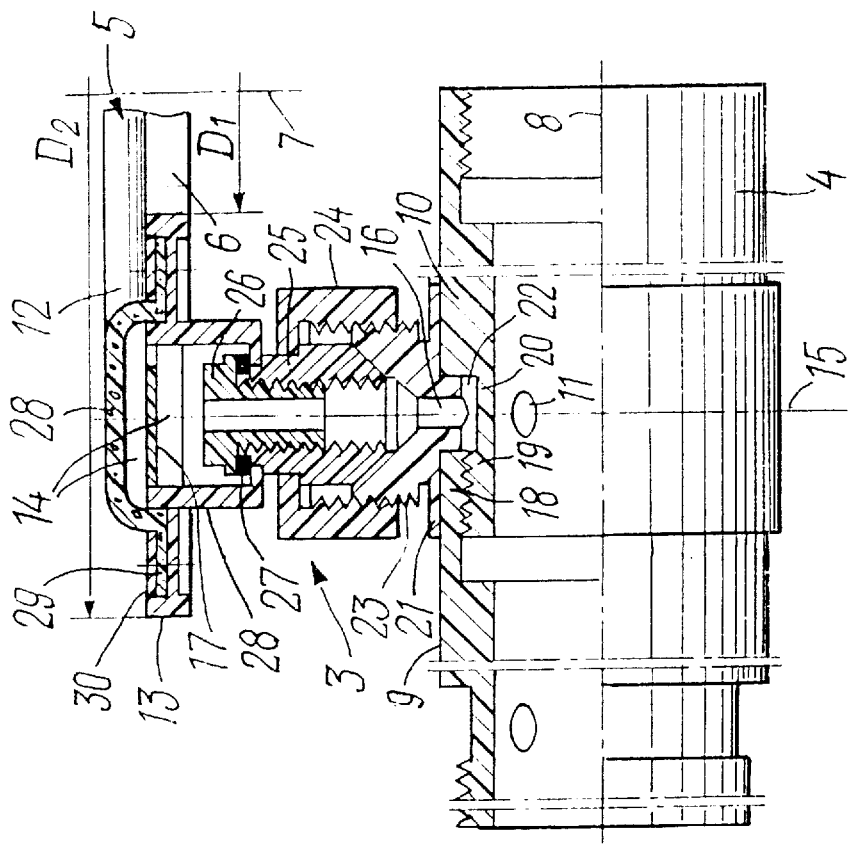
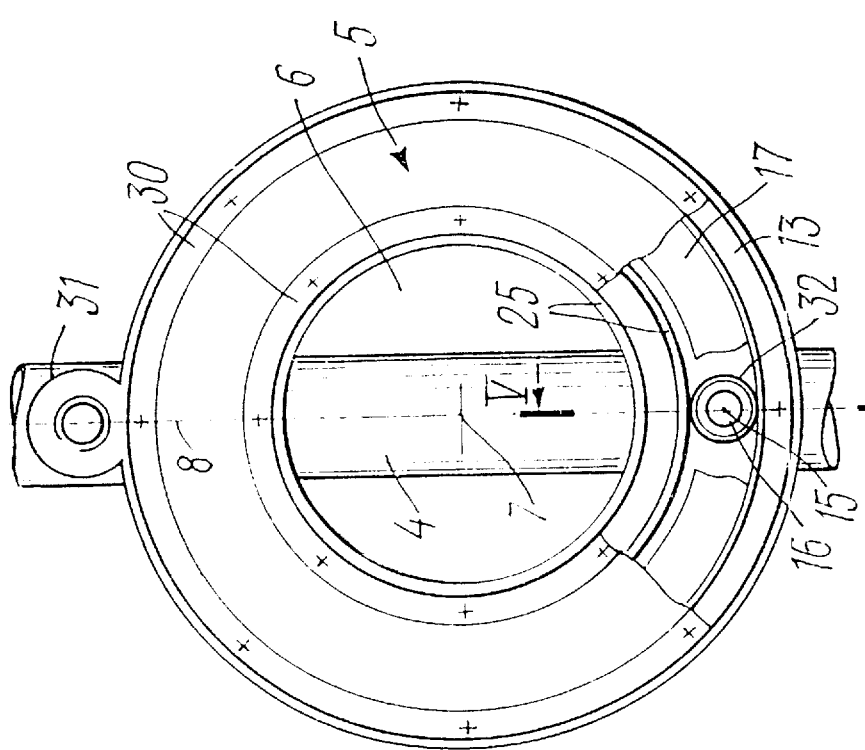

5,888,391

AERATING DEVICE

The present invention relates to saturation of liquids with gases and more specifically, to an aerating device.

FIELD OF THE INVENTION

The present invention can find application in systems for aerating natural water and industrial sewage during its biological treatment, in floatation systems, for water chlorination, for air supply in water-and-air cleaning of the granular medium of filters used in treatment of natural and industrial sewage, and removal of filtered liquid after its treatment, as well as for soil drainage in land hydroamelioration.

BACKGROUND OF THE INVENTION

One state-of-the-art aerating device is known (cf. an advertising prospectus "Brandol area" of Messrs Schumacher GmbH & Co.KG, Germany, 1989) to comprise a tubular air conduit provided with radial holes arranged lengthwise one of the generatrices thereof. A cylinder-shaped dispersing member is held to the peripheral surface of said tubular air conduit above each of said holes, said element being plugged at both ends.

The aforesaid aerating device features a high degree of dispersion of the compressed air fed into the liquid being aerated. However, a sophisticated construction of their attachment to the air distributor affects adversely the operating reliability of the aerating device, because compressed air may make its way into the liquid at the place of attachment of the dispersing member to the air distributor.

Another state-of-the-art aerating device is known (cf. the textbook "Aerators for sewage water treatment" by B. M. Khudenko et al., Stroiizdat Publishers, Moscow, 1973, p.36 (in Russian) to comprise a header for feeding compressed air to the aerating device, said header communicating with an air conduit assembled from a plurality of series arranged aerating modules tightly held together, each of said modules having a tubular member provided with at least one radial hole, and a disperser located outside of said tubular member and communicating therewith by compressed air through said radial hole.

The aforesaid known aerating device makes use of dome- or disk-type disperser disposed horizontally above the tubular member. The dispersing member of the disperser together with the baseplate defines an air-tight space to which compressed is admitted to pass from the tubular member. The disperser is joined together with the tubular member by a fastening bolt through which compressed air is fed. The disperser-to-tubular member attachment point is made airtight due to the provision of a rubber gasket.

A water-air flow is established above the disperser during operation of the known aerating device, said flow moving at a velocity of 1 to 3 m/s so as to saturate the liquid under aeration with air bubbles. In this case larger air bubbles appear above the central disperser portion in the area where compressed air is fed thereto, which affects adversely mass-exchange processes occurring in the liquid being aerated.

Furthermore, an ascending water-air flow develops a rarefaction zone in the surrounding liquid, with the result that the sludge settled on the aerotank bottom gets involved in the flow motion. However, a considerable proportion of the sludge is stuck to the disperser bottom portion and to its side and a top portion adjacent to the bottom portion thereof. This reduces an active disperser surface and decreases the degree of aeration of sludgy sediments which in turn affects the vital activity of microorganisms living in said sediments. A higher air flow rate fails to eliminate sludge sticking to the disperser.

The width of the aeration belt can be changed in the known aerator depending on specific operating conditions by using dispersers of another diameter, which involves complete dismantling of the whole system and is therefore technically hard to perform. Use of larger-diameter dispersers and an increased air flow rate might result in the course of operation in inadmissible vibration which is liable to destroy the disperser-to-air conduit attachment points.

The fact that the dispersing member is joined together with the baseplate and both of them are held to the air conduit by a bolt through which compressed sir is fed results in loss of air-tightness in the course of aerator operation, which affects the mass-exchange processes.

SUMMARY OF THE INVENTION

It is a principal object of the present invention to provide a better mass-exchange in the liquid being aerated for its better aeration.

It is another object of the present invention to provide a more uniform distribution of air bubbles in the area of contact with the liquid under aeration.

It is one more object of the present invention to provide a possibility of changing the width of the aeration belt in order to suit the operating conditions.

It is a further object of the present invention to provide a simpler erection of the present aerating device.

The foregoing object is accomplished due to the fact that in an aerating device comprising a header for feeding compressed air to the aerating device, said header communicating with an air conduit assembled from a plurality of series arranged aerating modules tightly held together, each of said modules having a tubular member having at least one radial hole, and a disperser located outside of said tubular member and communicating therewith by compressed air through said radial hole, at least one of the aerating modules has a tubular member made up of two serially arranged coaxial components tightly held together, and an annular disperser having a central hole for water to pass, a central vertical axis, and an outside diameter equal to 1.5 to 2.6 diameters of its central hole, said annular disperser being horizontally cantilevered above the sectional tubular member in the area where its two components are held together and comprises a seating ring which forms the disperser bottom portion having a hole for compressed air to pass, said hole being located in the area of the annular disperser-to-sectional tubular member attachment point and having a central vertical axis misaligned with respect to the central vertical axis of the annular disperser, a dispersing member establishing a top portion of the annular disperser, which is tightly fixed in position along an inner and outer perimeter of said seating ring so as to establish an annular space together therewith, and a ring-shaped throttling member, said annular disperser further comprising a device for its being held in place to the sectional tubular member, said device having a substantially vertical passage for the sectional tubular member to communicate with the annular disperser, said passage being coaxial with the hole of the seating ring for compressed air to pass and communicating the hole of the seating ring with at least one radial hole of the sectional tubular member, said annular disperser being so arranged as to perform setting-up motions round the central vertical axis of the hole of the seating ring for compressed air to pass, while a total flow passage area of the throttling member equals from 0.15 to 1.0 the cross-sectional area of the vertical passage to establish communication between the sectional tubular member and the annular disperser.

A combination of the aforestated construction features of the proposed aerating device enables one to improve mass-exchange processes proceeding in the liquid being aerated. Provision of an annular disperser allows the water together with the sludge settled on the aerotank bottom to ascend through the central disperser hole, thus substantially reducing sludge sticking to the power portion of the disperser. In addition, the sludge that is in a suspended state is further aerated in a water-air flow running from the dispersing member which promotes biologic vital activity of microorganisms.

Of importance is also the ratio between the disperser outside diameter and the diameter of its central hole which is variable within 1.5 and 2.6. With said ratio below 1.5 the resistance offered to flow of compressed air rises above the permissible value; conversely, with said ratio exceeding 2.6 disperser vibration at a preset air flow rate may exceed the permissible value specified for a given construction of the disperser attachment.

It is due to the provision of an annular dispersing member that the degree of dispersion of air is increased owing to a uniform air distribution over the entire disperser interior, which rules out formation of large air bubbles in the compressed feeding area, thus improving mass-exchange processes. In this case the degree of air dispersion is increased and the amount of power consumed is reduced. The range of variation in the ratio between the flow passage area of the dispersing member and the cross-sectional area of the vertical passage is found experimentally and is accounted for by the fact that with the ratio between said areas below 0.15, the resistance offered to compressed air flow by the throttling member exceeds the permissible value, and when said ratio is above 1.0, air distribution over the disperser annular space is not observed.

It is due to the provision of a possibility for disperser to perform setting-up motions that an aeration belt as wide as possible can be established, which is the case with low-pressure high-capacity aerating devices. Changing the position assumed by the disperser makes it possible to establish a medium and even a narrow aeration belt, which is the case with high-pressure aerating devices. Thus, the proposed aerating device is in fact adequately versatile and can be readily set up to adapt to the required operating conditions.

To join together the components of the sectional tubular member, use made of a threaded connection. It is reasonable that one component of the sectional tubular member has a female thread, while the other component thereof is provided with a male thread, an annular groove being provided on the run-out thread portion, said run-out portion having said radial hole for compressed air to feed to said annular space. The tubular components of the tubular member establish an air-tight threaded joint by means of a sleeve which encompasses said threaded joint from outside to overlap the latter and to define, together with said annular groove and the tubular member end faces, an annular chamber communicating with the vertical passage.

Such a construction arrangement makes it possible to simplify erection of the device, since air is admitted to pass from the radial holes into the vertical passage through said annular chamber serving as a kind of a header, which does not require bringing the radial holes in alignment with the entrance opening of the vertical passage when erecting the aerating device. The operating reliability of the device is enhanced and compressed is prevented from making its way into the liquid being aerated.

Use of a box-shaped dispersing member with its open end facing the seating ring and having rounded-off corners and a flat portion provides for most efficient use of the dispersing surface of the disperser, because in this case the entire dispersing surface becomes effective. It is reasonable in this case that said flat portion has a width equalling 0.05 to 0.65 the diameter of the central hole for the water to pass, since with the width of said portion below 0.05 the central hole diameter, the dispersing member offers a higher resistance to air flow, and when said portion has a width exceeding 0.65 the said diameter, a uniform air distribution over the dispersing surface cannot be attained and said surface experiences vibration that may exceed the values permissible for a given construction.

The proposed aerating device makes use of a throttling member which appears as an orifice plate disposed horizontally in the annular space of the annular disperser leaving one or two radial clearances with respect to its walls. Such a construction arrangement of the disperser is reasonably simple and at the same time provides for a uniform compressed air distribution over the dispersing member.

To reduce disperser vibration and provide more reliable attachment the aerating device has a means for holding the disperser in a horizontal position, said means being situated on the outside of the disperser opposite the area of its attachment to the tubular member.

Other objects and advantages of the invention will be apparent hereinafter from a detailed description thereof.

BRIEF DESCRIPTION OF THE DRAWINGS

In what follows the present invention will hereinafter be explained in the disclosure of exemplary embodiments thereof given by way of illustration to be taken in conjunction with the accompanying drawings, wherein:

FIG. 4 is a view of FIG. 2 showing another position of the disperser; and

FIG. 5 is a section taken along the line V—V in FIG. 4

DESCRIPTION OF THE PREFERRED EMBODIMENT

Figure 1:
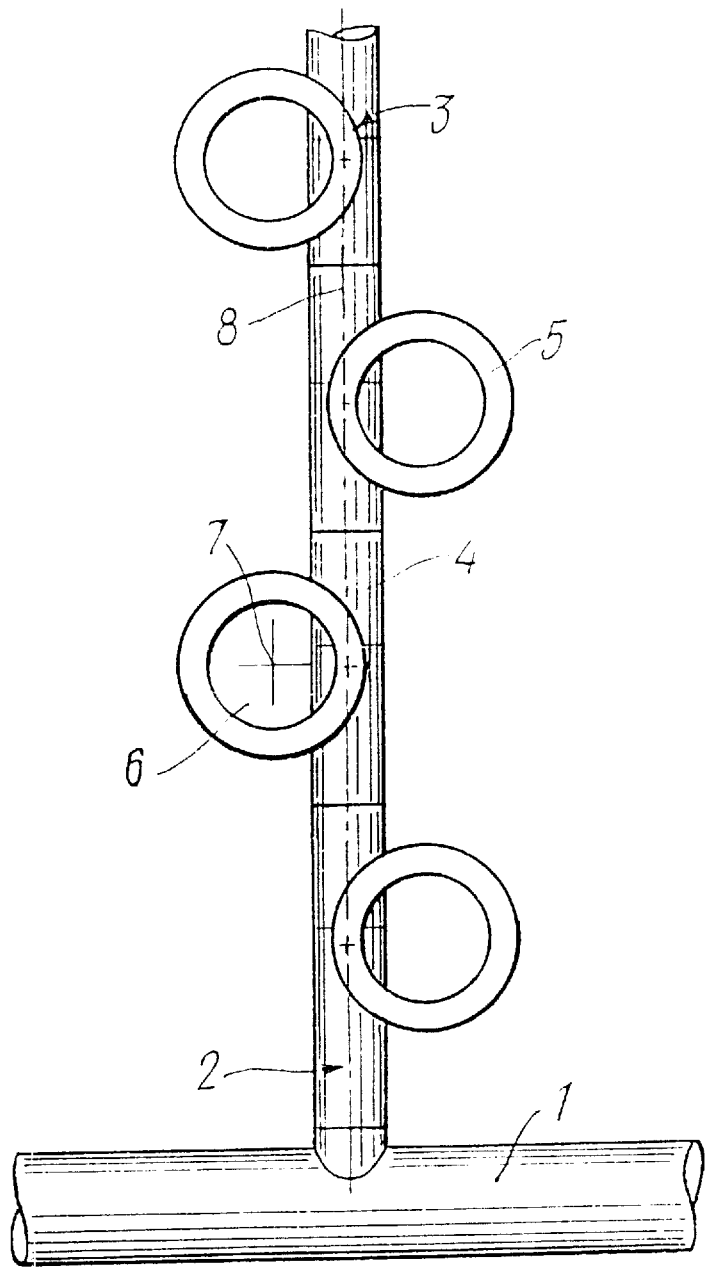
FIG. 1 is a schematic general plan view of the aerating device, according to the invention.

The aerating device, according to the present invention, comprises a header 1 (FIG. 1) for feeding compressed air thereto, an air conduit 2 communicating with the header 1 by compressed air and assembled from a plurality of aerating modules 3 tightly held together by means of, e.g., a threaded joint.

At least one of the aerating modules 3 (all the modules 3 in this particular embodiment of the invention) comprises a sectional tubular member 4 carrying an annular disperser 5 having a central hole 6 for water to pass. The aerating modules 3 intercommunicate through their tubular members 4 to form the working member of the aerating device which is installed on the bottom of an aerotank (omitted in the drawing). The number of the aerating modules 3 depends on the size of the aerotank and a preset air flow rate. The principal members and units of the aerating device may be made of, e.g., high-density polyethylene.

The aerating modules 3 provided with the annular dispersers 5 may alternate with aerating modules of another construction, which is determined by specific operating conditions.

The annular disperser 5 is horizontally cantilevered on the tubular member 4 (the attachment point being shown schematically) with a possibility of performing setting-up motions with respect thereto during the erection procedure. FIG. 1 illustrates an embodiment with a first outer position of the disperser 5, where the diameter passing through its central vertical axis 7 and the schematic point of attachment to the tubular member 4 is square with an axis 8 of the air conduit 2. With such an arrangement of the disperser 5 a maximum width of the aeration belt is attained, which is the case with low-pressure high-capacity aerating devices. Such aerating devices make most widespread use of the tubular members 4 that establish the air conduit 2 having a nominal diameter of from 0.1 to 0.15 m and a length of from 0.3 to 1.0 m.

In other variants depending on specific operating conditions the position of the disperser 5 may be changed to a second outer one, where said diameter of the disperser 5 is aligned with the axis 8 of the air conduit 2. Such a construction arrangement is used predominantly in high-pressure aeration of the deeply immersed low- and medium-capacity aerating modules 3. In this case use is made of the tubular member 4 having a nominal diameter of from 0.025 to 0.1 m.

The tubular element 4 of the last aerating module 3 is provided with a plug (omitted in the drawings) preventing compressed air against escaping from the aerating device.

FIGS. 2, 3 and 4, 5 illustrate the aerating module 3 installed on the air conduit 2 in accordance with the aforesaid first and second outer positions of the disperser 5.

Indicated in the drawings are a diameter $D_1$ of the central hole 6 of the disperser 5 for the water to pass, and its outside diameter $D_2$. The $D_2/D_1$ ratio may vary within 1.5 to 2.6. With said ratio below 1.5 the resistance offered to compressed air flow rises above the permissible value; conversely, with said ratio exceeding 2.6 vibration of the disperser 5 at a preset air flow rate may exceed the permissible value specified for a given construction of the disperser attachment.

Of importance in manufacturing the annular dispersers 5 is also an absolute value of $D_1$ which is usually variable from 0.1 to 0.3 m. When said diameter is below 0.1 m sludge-carrying water fails to be entrained in an ascending motion through the central hole 6 in the disperser 5. In this case a narrow water-air flow is formed above the surface of the disperser 5 and air bubbles are enlarged in said flow, which affects adversely mass-exchange processes in the liquid being aerated. When the diameter $D_1$ exceeds 0.3 m, this causes vibration of the disperser 5 to go over the values permissible for a given construction of the disperser attachment and also affects sludge intake from the aerotank bottom.

The tubular member 4 is made up of the serially arranged coaxial components 9, 10 arranged along the axis 8 and tightly held together through a threaded joint. At least one radial hole 11 is provided in either of the components 9 and 10, e.g., in the component 10 for feeding compressed air from the air conduit 2.

The upper portion of the disperser 5 is formed by an annular dispersing member 12 made of, e.g., low-density cellular polyethylene, and the bottom portion thereof is established by a seating ring 13, said member 12 and said ring 13 defining an annular space 14 therebetween and being held together along an inner and an outer perimeter by means of, e.g., rivets (not shown).

A hole is provided in the seating ring 13 at the point of attachment of the disperser 5 to the tubular member 4 for compressed air to pass to the annular space 14, a central vertical axis 15 of said hole being misaligned with respect to the central vertical axis 7 of the disperser 5.

The disperser 5 is rigidly cantilevered on the tubular member 4 through a fastening means, wherein a substantially vertical passage 16 is provided for establishing communication between the sectional tubular member 4 and the annular disperser 5, said vertical passage being coaxial with the hole in the seating ring 13. When erecting the aerating device, the disperser 5 can perform the aforementioned setting-up motions round the central vertical axis 15 of the hole in the seating ring 13 within the range of from 0 to 90 degrees.

A throttling member is provided in the annular space 14, appearing in the embodiment described herein (FIGS. 2, 3) as an orifice plate 17 cantilevered on one face of the seating ring 13 by virtue of, e.g., adhesive bonding or welding and positioned with a clearance with respect to the opposite face of the seating ring 13. The throttling member provides for uniform compressed air over the annular space 14 and prevents formation of large air bubbles, thereby adding to the degree of air dispersion, reducing power consumption, and providing an efficient sewage aeration as a whole.

In an alternative embodiment of the present invention (FIGS. 4, 5) the orifice plate 17 is arranged in the annular space 14 with two radial clearances relative to the faces of the seating ring 13. In this case the orifice plate 17 may be held to the seating ring 13 using, e.g., wood screws (omitted in the drawing). Such a construction arrangement of the throttling member is most reasonable to be used in low-pressure aeration systems.

In both cases mentioned above a total flow passage area of the throttling member equals from 0.15 to 1.0 the cross-sectional area of the vertical passage 16. Such a range has been found experimentally and is accounted for by the fact that with the ratio between said areas below 0.15, the resistance offered to compressed air flow by the throttling member exceeds the permissible value, and when said ratio is above 1.0, air distribution over the annular space 14 is not observed.

As has been stated before, the components 9 and 10 of the tubular member 4 establish a threaded joint, wherein a female pipe thread 18 is provided one end of the component 9 and a male pipe thread 19 is made on the end of the component 10 engaged therewith, an annular groove 20 being provided on the run-out portion of the thread 19, said run-out thread portion having the radial holes 11.

The threaded joint mentioned before is overlap-encompassed by a sleeve 21 set in the annular groove 20 and forced between that end face of the component 10 which adjoins the annular groove 20, and the end face of the component 9 of the tubular member 4. The annular groove 20 establishes, together with said end faces and the face of the sleeve 21, an annular chamber 22 which simplifies assembling the aerating device, because air is admitted to pass from the radial holes 11 into the vertical passage 16 through said annular chamber 22 serving as a kind of a header, which does not require bringing the radial holes 11 in alignment with the entrance opening of the vertical passage 16 when erecting the aerating device.

The opposite ends of the components 9 and 10 of the tubular member 4 are also provided with a respective thread for tightly joining together the tubular members 4 of the adjacent aerating modules 3.

The sleeve 21 has a threaded connector 23 onto which a union nut 24 is screwed, inside which a leading-through bush 25 and a hollow bolt 26 are coaxially arranged, an elastic washer 27 being interposed therebetween to prevent the head of the bolt 6 against being torn off under abnormally high vibration of the disperser 5.

The bottom portion of the seating ring 13 has a cylindrical locating projection 28 having a hole adapted to receive the head of the hollow bolt 26 and the elastic washer.

The aforedescribed construction arrangement of the means for holding the disperser 5 to the tubular member 4 provides for an air-tight interconnection of the units of the aerating module 3 and enables the annular disperser 5 to perform setting-up motions round the vertical axis 15 due to its turning, together with the leading-through bush 25, relative to the threaded connector 23.

According to the invention disclosed herein, the dispersing member 12 (FIG. 5) is box-shaped with its open end facing the seating ring 13 and having rounded-off corners and a flat portion 28 whose width ranges from 0.05 to 0.65 the diameter $D_1$ of the hole 6 in the disperser 5. with the width of said portion below 0.05 the central hole diameter, the dispersing member offers a higher resistance to air flow, and when said portion has a width exceeding 0.65 the said diameter, a uniform air distribution over the dispersing surface cannot be attained and said surface experiences vibration that may exceed the values permissible for a given construction. The dispersing member 12 is provided with flanges 29 which are forced from above against the seating ring by washers 30 and are fixed in position by rivets. In addition, the surface of the flanges 29 adjacent to the seating ring 13 is bonded thereto with a special adhesive for polyethylene.

The aerating modules 3 are held to the aerotank bottom by means of commonly known fasteners (not shown).

To reduce vibration of the disperser 5 and attain its more reliable attachment provision is therein made for a means holding the disperser 5 in a horizontal position, which appears in the present embodiment as at least one lug 31 provided with a hole and situated on the outside of the disperser 5 opposite to the area where the latter is attached to the tubular member 4.

Figure 3:
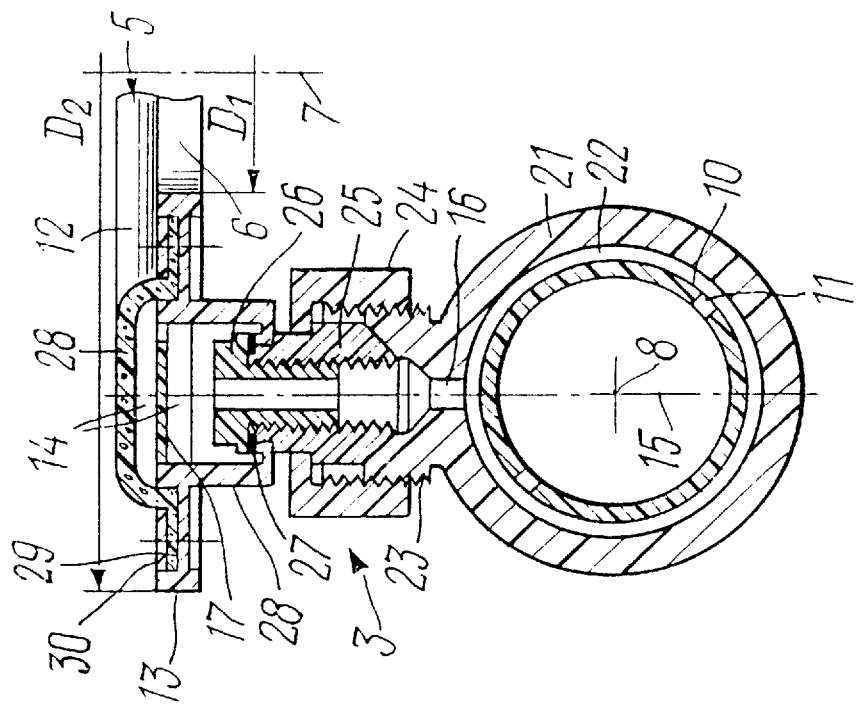
FIG. 3 is a section taken along the line III—III in FIG. 2.
Figure 2:
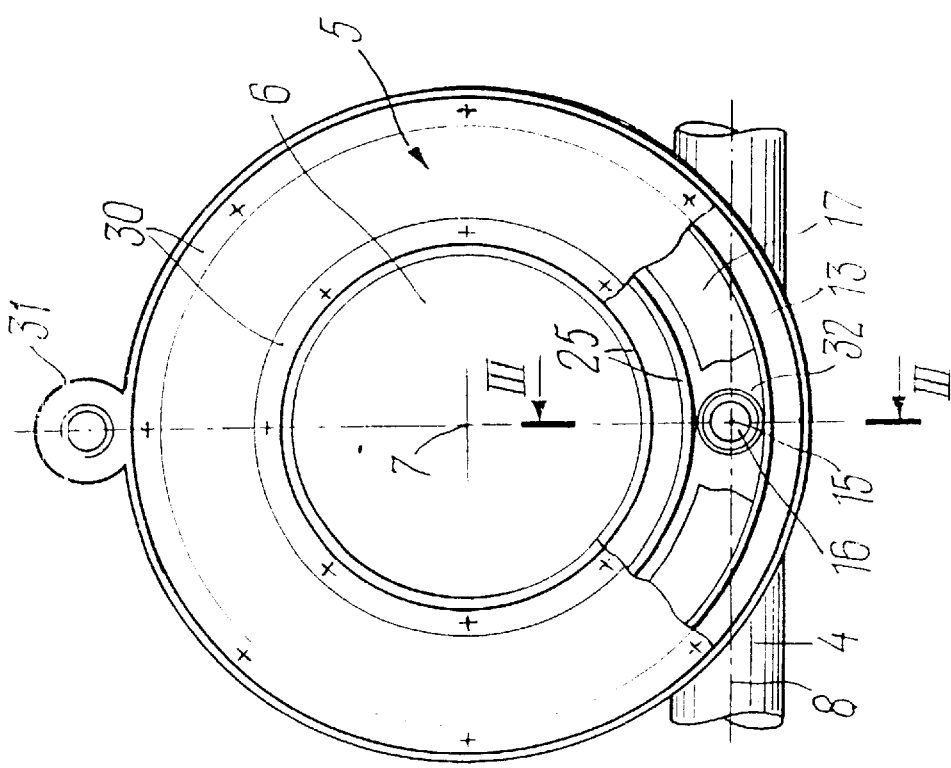
FIG. 2 is a partially cutaway plan view of an aerating module of the aerating device, according to the invention.

Whenever the disperser 5 is installed as shown in FIGS. 1–3, the lug 31 is held to the aerotank bottom, and when it is positioned as illustrated in FIGS. 4, 5, the lug 31 is secured on the tubular member 4.

When in the immersed state at the aerotank bottom, the aerating device operates as follows.

Compressed air is fed from the air header 1 (FIG. 1) to the air conduit 2 made up of the tubular members 4 and further through the radial holes 11 (FIGS. 2–5) to the annular chamber 22 and the vertical passage 16 which communicates with the annular space 14 of the disperser 5. Then compressed air passes through the throttling member, thus providing a uniform air distribution over the annular space 14. Further on compressed air passes through the dispersing member 12 and emerges into the liquid under aeration in the form of fine air bubbles, thus forming a water-air mixture above the surface of the disperser 5 which saturates the liquid with oxygen.

The dispersing member 12 establishes a kind of water-air flow above the annular dispersing surface and the central hole 6 for water to pass, said flow moving with a velocity of from 1 to 3 m/s so that a reduced-pressure are is established above said hole 6 which results in an intense water intake together with the sludge settled on the aerotank bottom. The sludge is in a suspended state and is additionally aerated in said water-air flow, which enhances vital activity of the microorganisms inhabiting the sludge.

The present invention is instrumental in improving mass-exchange processes in the liquid being aerated and reducing power consumed for air dispersion, thus ensuring a more efficient sewage aeration as a whole.

What we claim is:

1. An aerating device, comprising:

a header adapted for feeding compressed air to said aerating device;

an air conduit communicating with said header and assembled from a plurality of series arranged aerating modules tightly held together;

each of said plurality of aerating modules having a tubular member and a disperser arranged outside of said tubular member and communicating therewith by compressed air;

at least one of said plurality of aerating modules having a tubular member sectional for length, and an annular disperser;

said annular disperser having a central hole for water to pass, a central vertical axis, and an outside diameter equalling from 1.5 to 2.6 the diameter of said central hole thereof;

said sectional tubular member made up of two series arranged coaxial components tightly held together and having a common longitudinal axis;

said annular disperser horizontally cantilevered above said sectional tubular member in the area where said two components are held together;

a seating ring of said annular disperser, forming the bottom portion of the latter and having a hole for compressed air to pass, said hole being provided in the area where said annular disperser is held to said sectional tubular member, and having a central vertical axis misaligned with respect to said central vertical axis of said annular disperser;

a dispersing member of said annular disperser, forming the top portion of the latter, tightly fixed along the inner and outer perimeters of said seating ring;

an annular space of said annular disperser, said space being defined by the inner surface of said seating ring and the inner surface of said dispersing member;

said annular disperser adapted to perform setting-up motions round said central vertical axis of said hole provided in said seating ring for compressed air to pass;

a first component and a second component of said sectional tubular member, one of said components having at least one radial hole adapted for compressed air to feed to said annular space of said annular disperser;

a means for fixing said annular disperser in place to said sectional tubular member, said means having a substantially vertical passage adapted to establish communication between said sectional tubular member and said annular disperser, said vertical passage being coaxial with said hole provided in said seating ring for compressed air to pass and intercommunicating said hole in said seating ring and said at least one radial hole in said component of said sectional tubular member;

a ring-shaped throttling member positioned in said space of said annular disperser between said inner surface of said seating ring and said inner surface of said dispersing member, said throttling member having a total flow passage area equal to from 0.15 to 1.0 the cross-sectional area of said vertical passage adapted to communicate said sectional tubular member with said annular disperser.

2. An aerating device according to claim 1, wherein said first component of said sectional tubular member has a first end whereon a female thread is provided, adapted to join said first component of said sectional tubular member with said second component thereof;

said second component of said sectional tubular member has a first end whereon a male thread is provided, adapted to join said second component of said sectional tubular member with said first component thereof, an annular groove being provided on the run-out portion of said thread, said annular groove being provided with said at least one radial hole for compressed air to feed to said annular space of said annular disperser;

said first and said second tubular components establishing an air-tight threaded joint, each of said first and said second tubular components having a free end for being tightly joined with said respective tubular member of said adjacent aerating module, and the aerating device having a sleeve which encompasses said threaded joint from outside to overlap the latter and to define, together with said annular groove, the end face of said first tubular component, and the end face of said portion of said second tubular component, an annular chamber communicating with said vertical passage of said means for rigidly holding said annular disperser to said sectional tubular member.

3. An aerating device according to claim 2, wherein said dispersing member has a box-shaped contour with its open end facing said seating ring and having rounded-off corners and a flat portion having a width equaling from 0.05 to 0.65 the diameter of said central hole provided in said annular disperser for water to pass.

4. An aerating device according to claim 3, wherein said throttling member appears as an orifice plate horizontally cantilevered in said annular space of said annular disperser with a radial clearance with respect to one of the faces thereof.

5. An aerating device according to claim 3, wherein said throttling member arranged horizontally in said annular space of said annular disperser and fixed in position on said seating ring with radial clearances with respect to the opposite faces of said annular disperser.

6. An aerating device according to claim 1, wherein said annular disperser is capable of performing setting-up motions round said central vertical axis of said holes provided in said seating ring for compressed air to pass, to an angle of up to 90 degrees.

7. An aerating device according to claim 1, wherein said annular disperser has a means for its being fixed in a horizontal position, said means being disposed outside of said annular disperser opposite to said area where it is held to said tubular member.

* * * * *